United States Patent
Singh et al.

(10) Patent No.: US 9,740,993 B2
(45) Date of Patent: Aug. 22, 2017

(54) DETECTING ANOMALIES IN FIELD FAILURE DATA

(75) Inventors: Satnam Singh, Bangalore (IN); Pulak Bandyopadhyay, Bangalore (IN); Calvin E. Wolf, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1889 days.

(21) Appl. No.: 12/630,866

(22) Filed: Dec. 4, 2009

(65) Prior Publication Data

US 2011/0137711 A1 Jun. 9, 2011

(51) Int. Cl.
G06Q 10/06 (2012.01)
G07C 5/08 (2006.01)
G06F 11/07 (2006.01)
G06Q 10/00 (2012.01)

(52) U.S. Cl.
CPC .......... *G06Q 10/06* (2013.01); *G06F 11/079* (2013.01); *G06Q 10/0639* (2013.01); *G06Q 10/20* (2013.01); *G07C 5/0808* (2013.01)

(58) Field of Classification Search
CPC .... G06Q 10/06; G06Q 10/0639; G06Q 10/20; G06F 11/079; G07C 5/0808
See application file for complete search history.

(56) References Cited

U.S. PATENT DOCUMENTS

| | | | |
|---|---|---|---|
| 4,817,418 A * | 4/1989 | Asami et al. | 73/114.77 |
| 4,989,146 A * | 1/1991 | Imajo | 701/31.5 |
| 5,041,976 A * | 8/1991 | Marko et al. | 701/32.9 |
| 5,123,017 A * | 6/1992 | Simpkins et al. | 714/26 |
| 5,570,376 A * | 10/1996 | Kunda et al. | 714/736 |
| 6,338,152 B1 * | 1/2002 | Fera | B61L 27/0094 709/207 |
| 6,633,784 B1 * | 10/2003 | Lovelace, II | B61L 3/125 246/122 R |
| 6,718,238 B1 * | 4/2004 | Laguer-Diaz | B61L 3/125 701/31.5 |
| 6,766,232 B1 * | 7/2004 | Klausner | 701/32.9 |
| 7,103,460 B1 * | 9/2006 | Breed | 701/32.9 |
| 7,260,501 B2 * | 8/2007 | Pattipatti et al. | 702/183 |
| 7,379,846 B1 * | 5/2008 | Williams | G06F 11/079 702/183 |

(Continued)

*Primary Examiner* — Matthew Gart
*Assistant Examiner* — Stephen S Swartz
(74) *Attorney, Agent, or Firm* — Quinn IP Law (57) ABSTRACT

A method of detecting anomalies in the service repairs data of equipment. A failure mode-symptom correlation matrix correlates failure modes to symptoms. Diagnostic trouble codes are collected for an actual repair for the equipment. The diagnostic trouble codes are provided to a diagnostic reasoner for identifying failure modes. Diagnostic assessment is applied by the diagnostic reasoner for determining the recommended repairs to perform on the equipment in response to identifying the failure modes. Each of the recommended repairs is compared with the actual repair used to repair the equipment. A mismatch is identified in response to any recommended repair not matching the actual repair. Reports are generated for displaying all of the identified mismatches. The reports are analyzed for determining repair codes having an increase in a number of anomalies. Service centers are alerted of a correct repair for the identified failure mode.

22 Claims, 8 Drawing Sheets

(56) References Cited

U.S. PATENT DOCUMENTS

| | | |
|---|---|---|
| 7,734,764 B2 * | 6/2010 | Weiner et al. ............... 709/224 |
| 7,865,278 B2 * | 1/2011 | Underdal et al. ........... 701/31.8 |
| 8,027,763 B2 * | 9/2011 | Webster et al. ............. 701/33.9 |
| 9,081,883 B2 * | 7/2015 | Wittliff, III ........... G06F 19/345 |
| 2002/0198997 A1 * | 12/2002 | Linthicum ........... H04L 69/329 |
| | | 709/227 |
| 2003/0046382 A1 * | 3/2003 | Nick ............................. 709/224 |
| 2008/0141072 A1 * | 6/2008 | Kalgren et al. ................ 714/33 |
| 2009/0096406 A1 * | 4/2009 | Flickinger .......... G05B 23/0283 |
| | | 318/565 |
| 2011/0066898 A1 * | 3/2011 | McRory et al. ............ 714/47.3 |
| 2011/0258044 A1 * | 10/2011 | Kargupta .............. G06Q 10/08 |
| | | 705/14.49 |

* cited by examiner

Fig. 5a — Build Date 7/6/2008 - 9/5/2008

Fig. 5b — Build Date 11/6/2008 - 1/5/2009

Fig. 5c — Build Date 9/6/2008 - 11/5/2008

Fig. 5d — Build Date 11/6/2008 - 1/5/2009

Fig. 5e — Build Date 1/6/2009 - 3/5/2009

Fig. 7a — Build Date 7/6/2008 - 9/5/2008

Fig. 7b — Build Date 11/6/2008 - 1/5/2/2009

Fig. 7c — Build Date 9/6/2008 - 11/5/2008

Fig. 7d — Build Date 11/6/2008 - 1/5/2009

Fig. 7e — Build Date 1/6/2009 - 3/5/2009

DETECTING ANOMALIES IN FIELD FAILURE DATA

BACKGROUND OF INVENTION

An embodiment relates generally to a method for identifying anomalies in the service repairs data.

Warranty reporting typically includes analyzing the warranty data as reported by service repair centers. Service repair centers, such as automotive dealerships, report service data to the original equipment manufacturers (e.g., automotive companies). Data is collected that includes the details of the repairs (repair codes), the fault codes (diagnostic trouble codes), customer complaints, trouble identified with the component, and the cost of the repair. Based on component and trouble identified, original equipment manufacturers determine whether there exists an ongoing issue with the component in which changes should be made to improve the quality of the component and reduce warranty costs. Warranty reporting typically takes time to analyze the field failure data. Moreover, any warranty reporting and potential corrective actions are based off of the assumption that the service technician correctly diagnosing the problem. However, misdiagnoses could result in a delay in finding the actual problem while causing repeat visits of customers, high diagnosis time and incurring unnecessary costs when making the incorrect repairs.

SUMMARY OF INVENTION

An advantage of aspects of the present disclosure is the early detection of new failure modes in the field, inappropriate use of repair codes and misdiagnoses of repairs of equipment. The system and method described herein uses a plurality of engineering principles to construct a failure mode-symptom correlation matrix which correlates failure modes to symptoms (fault codes, operating parameter ranges, customer complaints, technician test results). Based on the information provided by the service providers and the failure mode-symptom correlation matrix, the equipment manufacturers can readily determine if the repair was appropriate or an anomaly. Data within the failure mode-symptom correlation matrix can be analyzed to determine early trends in misdiagnoses and can be distributed to service centers to assure that the correct repairs are being made.

An embodiment contemplates a method of detecting anomalies of service repairs for equipment. A failure mode-symptom correlation matrix is provided along with a diagnostic reasoner that correlates failure modes to symptoms that identify failure modes. Each of the failure modes are identifiable with a respective occurrence in how equipment failure can occur in the field. The correlation of the symptoms to the failure modes are generated in response to a plurality of engineering principles. Fault codes or diagnostic trouble codes are collected for an actual repair for the equipment. The diagnostic trouble codes relate to a potential malfunction of a component in the equipment as identified by a processor of the equipment. The diagnostic trouble codes are provided to a diagnostic reasoner. These correlations are captured in the failure mode-symptom correlation matrix. Using the failure mode-symptom correlation matrix and the symptoms present in the component, diagnostic assessment is applied by a diagnostic reasoner for determining the recommended repair to perform on the equipment in response to the diagnostic trouble codes and the correlations of the failure modes and symptoms in the failure mode-symptom correlation matrix. The recommended repair is compared with the actual repair performed on the equipment. A mismatch (or anomaly) is identified in response to the recommended repair not matching the actual repair. Reports are generated for displaying all of the identified mismatches (or anomalies). The reports are analyzed for determining repair codes having an increase in a number of anomalies. Service centers are alerted of a correct repair for the identified failure mode.

An embodiment contemplates a field failure detection system that includes a failure mode-symptom correlation matrix that correlates failure modes to symptoms. Each of the failure modes is identifiable with a respective occurrence in how equipment failure can occur. The symptoms that detect failure modes are generated in response to a plurality of engineering principles. A memory stores diagnostic trouble codes of repaired equipment. The diagnostic trouble codes relate to a potential malfunction of a component in the equipment as identified by a processor of the equipment. The memory stores repair codes, repair cost and part number representing a repair made to the repaired equipment by a service provider. Further, the memory also stores customer complaints, engineering operating parameters data. A processing unit correlates the diagnostic trouble code with the failure mode-symptom correlation matrix for identifying a failure mode of the equipment. The diagnostic reasoner and the failure mode-symptom correlation matrix which resides in processing unit determine the repairs to perform on the equipment in response to the symptoms present in the equipment. The recommended repair list is compared with the actual repair used to repair the equipment. A mismatch (or anomaly) is identified in response to the recommended repair not matching the actual repair. Reports are generated that analyzes trends in the identified mismatches (or anomalies) for determining which repair codes have an increase in the number of anomalies.

DETAILED DESCRIPTION

Figure 1:
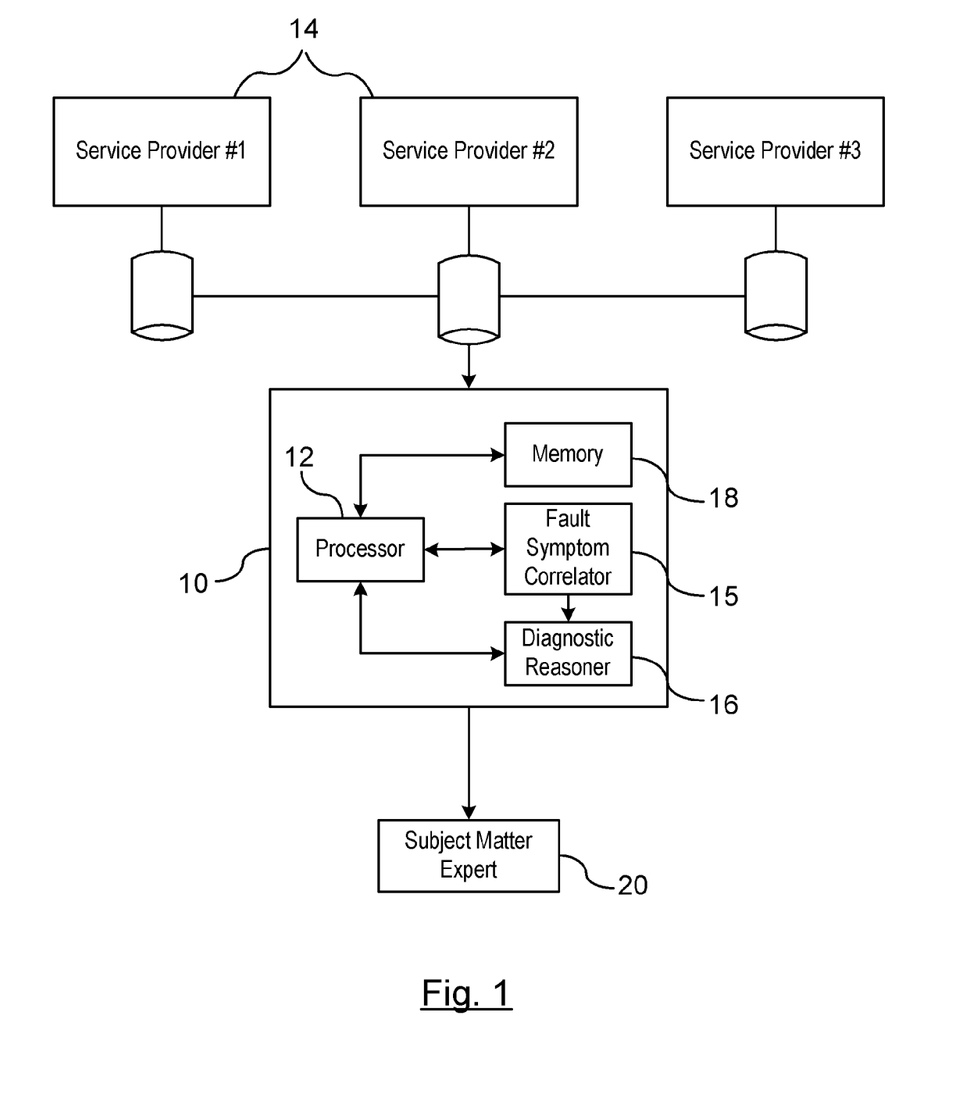
FIG. 1 is a block diagram of a field failure anomaly detection system.

There is shown in FIG. 1 block diagram of a field failure anomaly detection system, shown generally at 10, for diagnosing problems with equipment, such as an automobile. The field failure anomaly detection system 10 includes a processor 12 for processing data retrieved by a plurality of service providers 14, such as car service dealerships and telematics services. The plurality of service providers 14 diagnoses issues with the equipment with the aide of service diagnostic tools. Diagnostic trouble codes (DTCs), which will be discussed in detail later, are retrieved from a vehicle processor memory, and used to determine the problem with the vehicle. Based on the DTCs, service manual, and analytical skills of the service technician, a vehicle repair is performed. The repair reported to the original equipment manufacturer is typically represented by a repair code. The DTCs in addition to the repair codes are provided to the field failure anomaly detection system 10 for analyzing the repair made. Alternatively, the data provided to the field failure anomaly detection system 10 may be stored in databases by the service providers and then batched to the field failure anomaly detection system 10 on a scheduled periodic basis.

The field failure anomaly detection system 10 further includes a failure mode-symptom correlator 15, a diagnostic reasoner 16, and memory 18. The failure mode-symptom correlator 15 includes a failure mode-symptom correlation matrix (shown in FIG. 2) that correlates failure modes with symptoms. The diagnostic reasoner 16 may be a stand-alone processor or the diagnostic reasoner 16 and the processor 12 may be integrated as a single processor. The diagnostic reasoner 16 with the aid of the failure mode-symptom correlator 15 determines what recommended repair should have been used to repair the equipment based on the reported DTCs. Data and results relating to the repair as determined by the plurality of service providers 14 are stored in the memory 18. The memory also stores customer complaints and engineering operating parameters data. The data and results are processed, plotted, and analyzed by a subject matter expert 20 for determining anomalies and trends with respect to misdiagnoses of the equipment.

Figure 2:
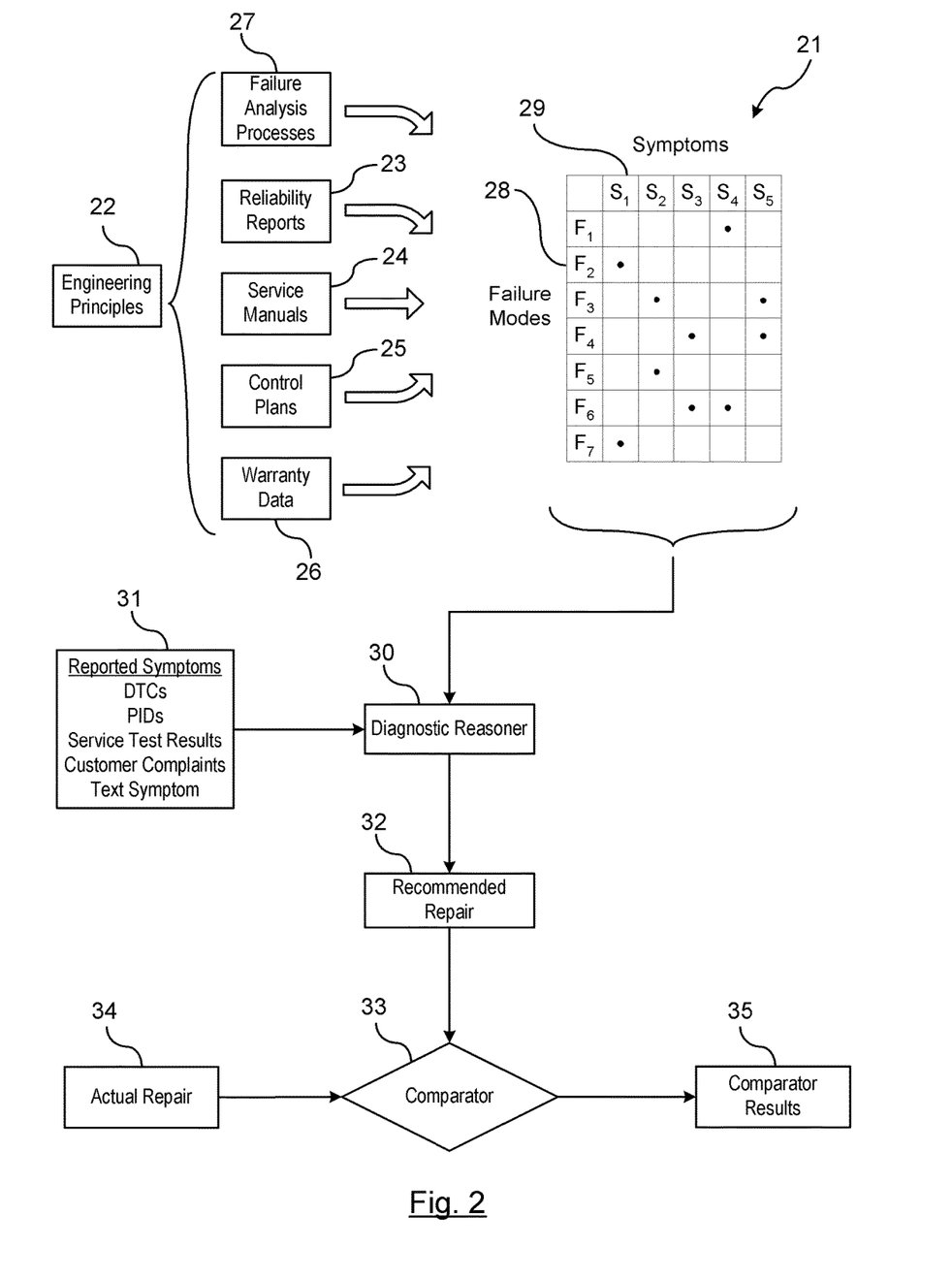
FIG. 2 is a flow diagram for detecting misdiagnosis of service repairs.
Figure 3A:
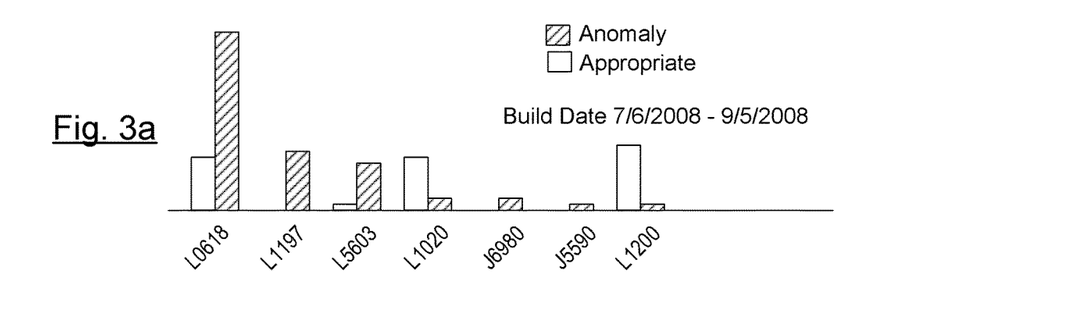
FIGS. 3a-3e is a bar comparison chart as a function of repair codes for different build dates of equipment.
Figure 3B:
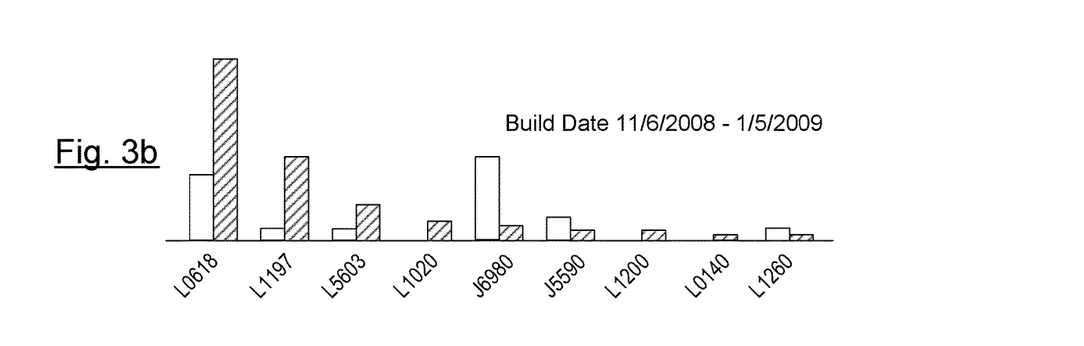
Figure 3C:
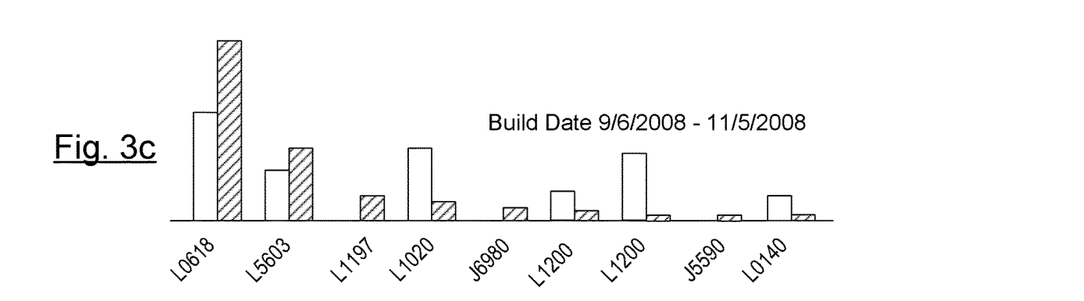
Figure 3D:
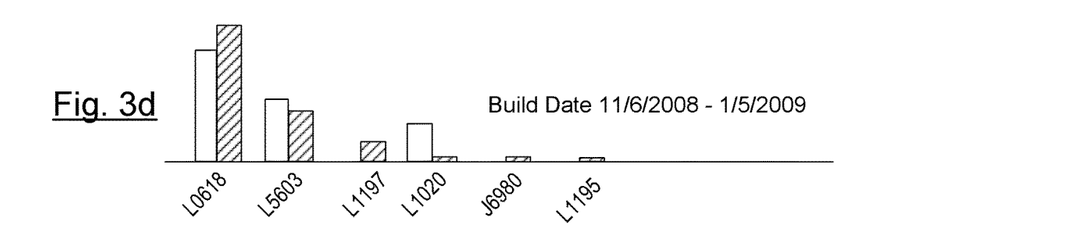
Figure 3E:
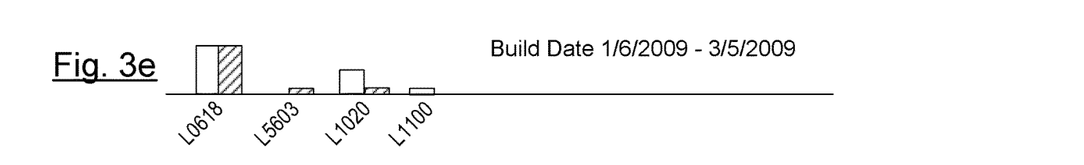

FIG. 2 is flow diagram illustrating the process flow for identifying misdiagnoses of equipment repairs.

A failure mode-symptom correlation matrix 21 (e.g., fault model or dependency matrix), which may reside in the processor or another module, correlates failure modes to symptoms for identifying the corrective repair that should have been used to fix the issue.

A plurality of engineering principles 22 are used to generate and correlate the failure modes 28 (e.g., $F_1$ to $F_7$) with the symptoms 29 (e.g., $S_1$ to $S_5$). The symptoms 29 (e.g., DTCs, customer complaints, operating parameters, test outcomes) are used by the service technician to analyze the problem and identify the necessary repair. The engineering principles 22 include, but are not limited to, reliability reports 23, service manuals 24, control plans 25, warranty data 26, and failure modes 28 analysis processes such as failure mode effects & analysis tools (FMEA) and failure mode effects and critically analysis tools (FMECA). It should be understood that depending on the scope of the fault-symptom correlation matrix, the matrix may be very large, and may be updated and refined so that the matrix identifies specific repair operations for each possible symptom. Further, various fault-symptom correlation matrices can be provided for different levels of the vehicle, where such matrices can be provided for the following levels of the vehicle that include, but are not limited to, specific vehicle subsystems, specific vehicle brands, makes and model.

The engineering principles 22 are generated by the subject matter experts having expert domain knowledge of the equipment and knowledge of the failures that can occur with the equipment. Such service matter experts may include engineers, technical experts, service and maintenance personnel, statisticians, and any other person having an in-depth knowledge of the equipment or the operation of the equipment. The failure modes of the equipment are collectively generated based on engineering knowledge, best practices, and past experiences of the subject matter experts.

The failure mode-symptom correlation matrix 21, as shown in FIG. 2, illustrates a plurality of failure modes 28 set forth in the rows of the table. Symptoms 29 set forth in the columns of the table are executed for testing and detecting the failure mode. A black dot or other representation (e.g., such as a Boolean character or a fractional value between 0 and 1) in a fault-symptom correlation matrix corresponds to a failure mode and associated symptom having a linking relationship. A respective symptom may be correlated with more than one failure mode. For example, a short-to-ground testing procedure for a respective portion of a wire harness may indicate more than one failure mode. As a result, more than one testing procedure may be required to identify the repair that is necessary to fix the problem with the equipment.

To determine whether a misdiagnosis has occurred for a respective service repair, repair data is retrieved from the service provider. Original equipment manufacturers, such as automotive companies, maintain an online repair reporting system. In this example, the vehicles are brought to a service repair center, such as a service department at a dealership. The service department will run a diagnostic check on the vehicle that communicates with one or more processors in the vehicle (e.g. engine control module). Each of the processors in the vehicle includes a memory or utilizes remote memory that stores DTCs when the vehicle experiences a problem and an error is detected. Storing the DTCs in the vehicle processor memory alleviates the service technician of trying to recapture the problem with the vehicle, particularly if the vehicle is not currently symptomatic of the problem; rather, the service technician can review the past history of any errors that have been stored in the memory of the vehicle for determining what issues were present with the vehicle when the problem occurred. DTCs are alphanumeric codes that are used to identify a problem that occurs with various subsystems within the vehicle. Such DTCs may be related to various vehicle functions that include, but are not limited to, engine operation, emissions, braking, powertrain, and steering. Each subsystem may have its own on-board processor for monitoring faults of the subsystem operation or a processor may be responsible for monitoring faults for a plurality of subsystems. When the subsystem processor detects a problem, one or more DTCs are generated. The DTCs are stored in the processor's memory and are later retrieved by the service technician when tested. The DTCs assist the service technician in pinpointing the area of concern. To retrieve a DTC, the service technician enters a mode on the scan tool requesting retrieval of DTCs stored for a current or past driving cycle. The scan tool may also use an on-board diagnostic parameter identifier (PID) for determining problems. A PID code is an operating parameter of a subsystem that is entered in the scan tool which is transmitted throughout a communication bus of the vehicle. One of the devices on the communication bus recognizes the PID code for which it is responsible and sends back a message to the scan tool relating to the device. The information may include data concerning its operating condition (e.g., ratio of the air-fuel mixture is provided so that a determination may be made whether the ratio is within a minimum and maximum value). The scan tool displays the message to the service technician. The service technician evaluates the message and determines what repair is required.

A repair code is used to identify the repair that is performed on the vehicle. The repair code is entered into a service reporting system and is provided to the field failure anomaly detection system where the original equipment manufacturer can review and analyze the information.

To check if a misdiagnosis has occurred, symptoms 31 that include, but are not limited to DTCs, PIDs, scan tool values, technician test outcomes, customer complaints, and text symptoms, are retrieved during the troubleshooting are provided to a diagnostic reasoner module 30. The diagnostic reasoner module 30 analyzes the reported symptoms 31 and determines which repair should have been performed on the equipment utilizing the failure mode-symptom correlation matrix 21. The recommended repairs are typically identified by repair codes 32 (e.g., labor code or any other type of code that the original equipment manufacturer utilizes).

The recommended repair codes 32 is input to a comparator 33. In addition, the actual repair code 34 that represents the actual repair made by the service technician on the vehicle is also input to the comparator 33. The comparator 33 determines whether the actual repair code match from any of the recommended repair codes. If the codes match, then the comparator 33 identifies the repair as an appropriate repair and is categorized accordingly. If the repair code does not match, then the comparator 33 identifies the repair as an anomaly (e.g., indicating that either a misdiagnosis has occurred or a new failure mode has occurred or there is an error in the service procedure) and the repair is categorized accordingly. The comparator results 35 output from the comparator 33 are charted and analyzed on a periodic basis to provide early detection as to whether the appropriate repairs are being made or whether misdiagnoses are occurring. Charts provide a visual illustration for the subject matter expert by identifying early trends occurring for misdiagnosis repairs.

FIGS. 3a-3e illustrate bar comparison charts of repair codes for vehicles based on the vehicle build dates. Each respective chart identifies a plurality of repair codes that were reported by many service centers and are grouped based on their vehicle build dates and vehicle model. Each reported repair code illustrated in each of FIGS. 3a-3e identifies the number of repairs that were correctly diagnosed and a number of repairs that were anomaly as determined by the comparator shown in FIG. 2. A direct comparison for the respective build date of the equipment identified by each chart can be analyzed. For example in FIG. 3a, repair code L0618 shows that 57 total repairs were made relating to repairs represented by L0618 for equipment built from Jul. 6, 2008 to Sep. 5, 2008. Of the 57 total (L0618) repairs for the respective build dates, the correlator module determined that 9 of the repairs were appropriately made while 48 of the repairs were anomalies. Each of the charts illustrates the respective repair codes reported for all equipment produced during the respective time periods and categorizes each repair code as an appropriate repair or an anomaly.

Figure 4:
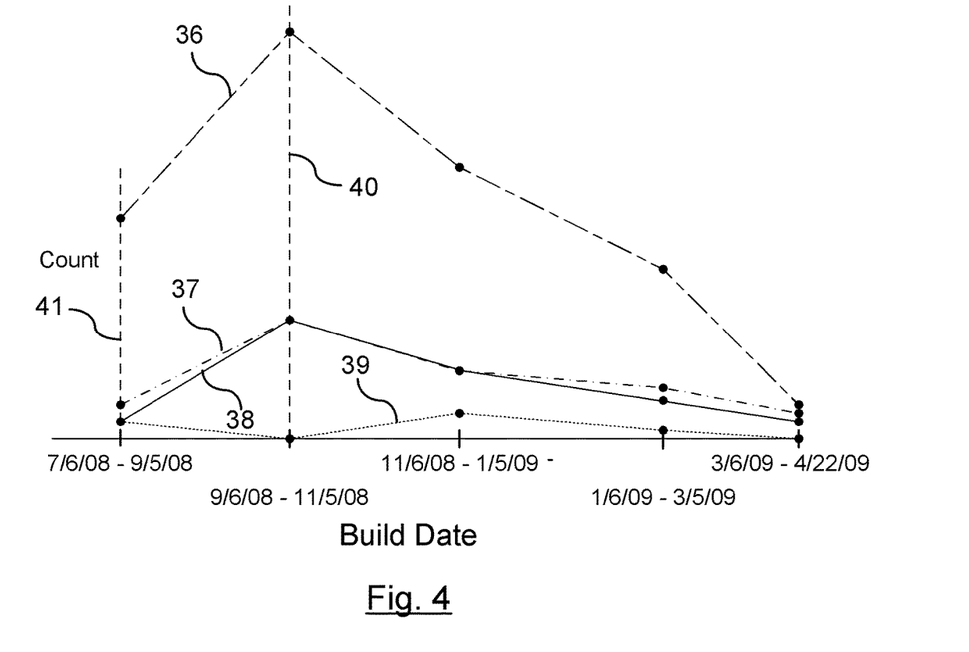
FIG. 4 is a line plot of repair codes having the highest anomalies.
Figures 5A, 5B, 5C:
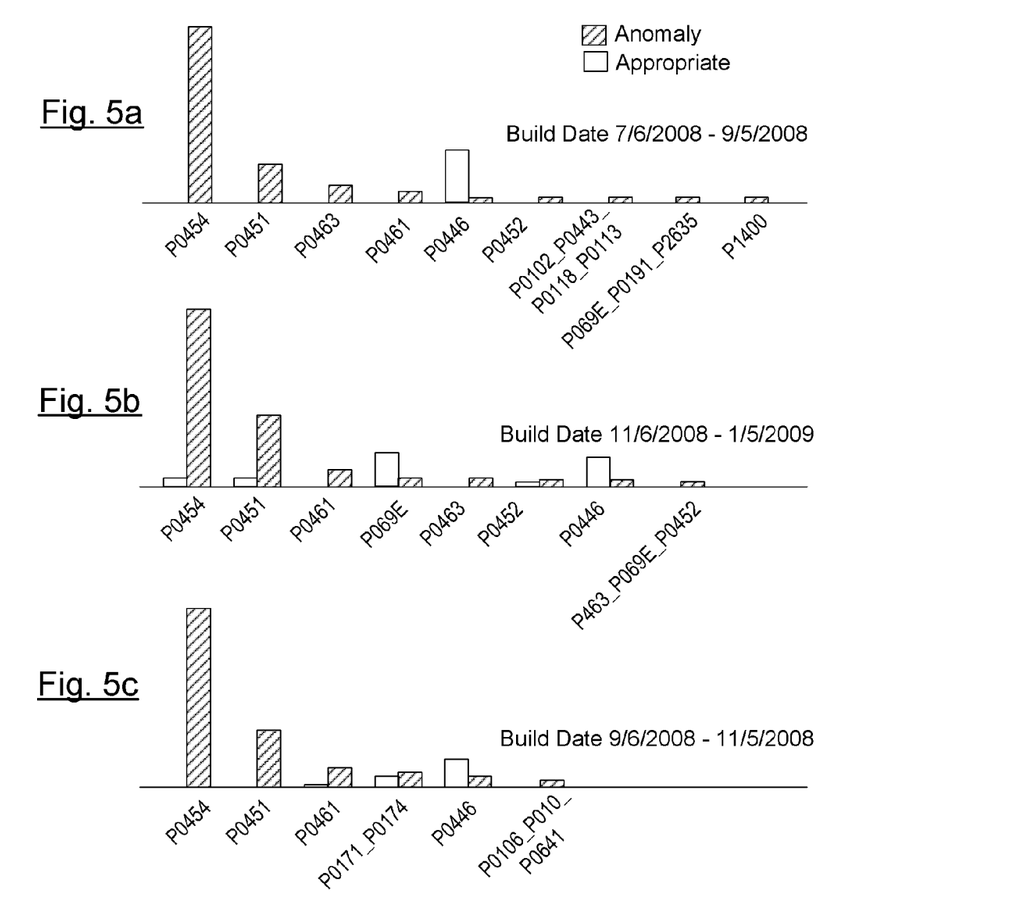
FIGS. 5a-5e is a bar comparison chart as a function of diagnostic trouble codes for different build dates of equipment.
Figure 5D:
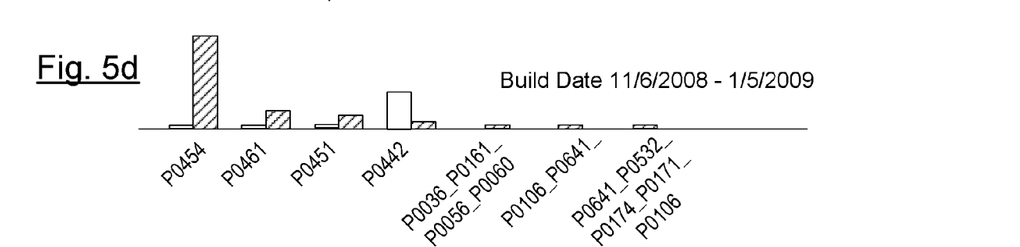
Figure 5E:
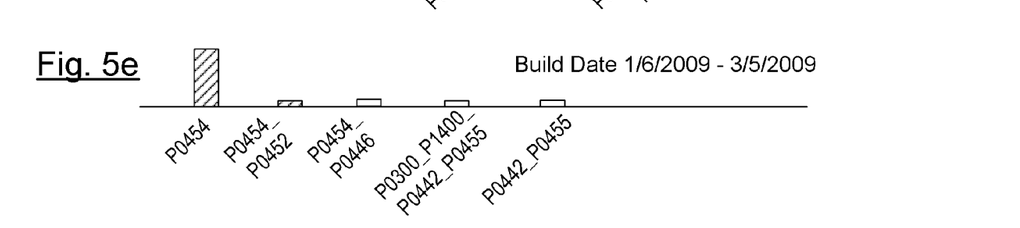

FIG. 4 illustrates a line chart showing the top anomalous repairs made over all build dates. Each respective line graph represents a respective repair code. For example, line 36 represents repair code L0618, line 37 represents repair code J5603, line 38 represents repair code L1020, and line 39 represents repair code J6980. A common practice as to when to detect anomalies in the data is typically identified when the data indicates a peak value as represented by 40. Utilizing the comparator module and plotting the line graph shows that the fault detection system can identify issues when the trend starts to increase early in data reporting period such as that shown at time period 41. The collective analyzation of the data allows subject matter experts to detect anomalies in data without having to manually analyze warranty reports or wait until warranty data has been collected over a large time interval. More importantly, the comparison of the correct diagnosis versus anomalies allows the subject matter expert to investigate and determine root causes for the anomalies by the service technicians. Typically anomalies could be due to misdiagnosis and a detection of misdiagnoses is delayed due to the lack of clues for determining the root cause as the personnel reviewing the data has to assume that the service technician has correctly made repairs based on the failure modes and DTCs. These reports can be analyzed on a weekly, monthly, or other periodic basis as set forth by the subject matter experts.

FIGS. 5a-5e illustrate bar comparison charts based on DTC codes. The charts for each respective build date period will illustrate those DTCs that were incorrectly and correctly identified. Each respective chart identifies whether the DTC code reported by many service centers for equipment built within a respective time period was appropriate based on its correlation with the repair codes. That is, the system determines whether the DTC reported is valid based on whether the repair code correctly correlates with the DTC by determining whether the recorded DTC has a valid relationship with the repair made. For example, a DTC is recorded that relates to a fuel system, but the repair code represents a repair made to the antilock braking (ABS) system. The system has no way of knowing whether the DTC recorded was in error or whether the service technician made an incorrect service procedure. However, what the data does indicate is there is a mismatch and this is identified in the graph so that the subject matter expert may have improper grouping that requires further investigation. The mismatch provides an indication that an anomaly is present with the repair. If a respective DTC is consistently identified as inappropriate, then the subject matter expert may further analyze the freeze frame data (PIDs data) to determine why the DTC is being associated with repairs codes that are non-related to the DTC.

Figure 6:
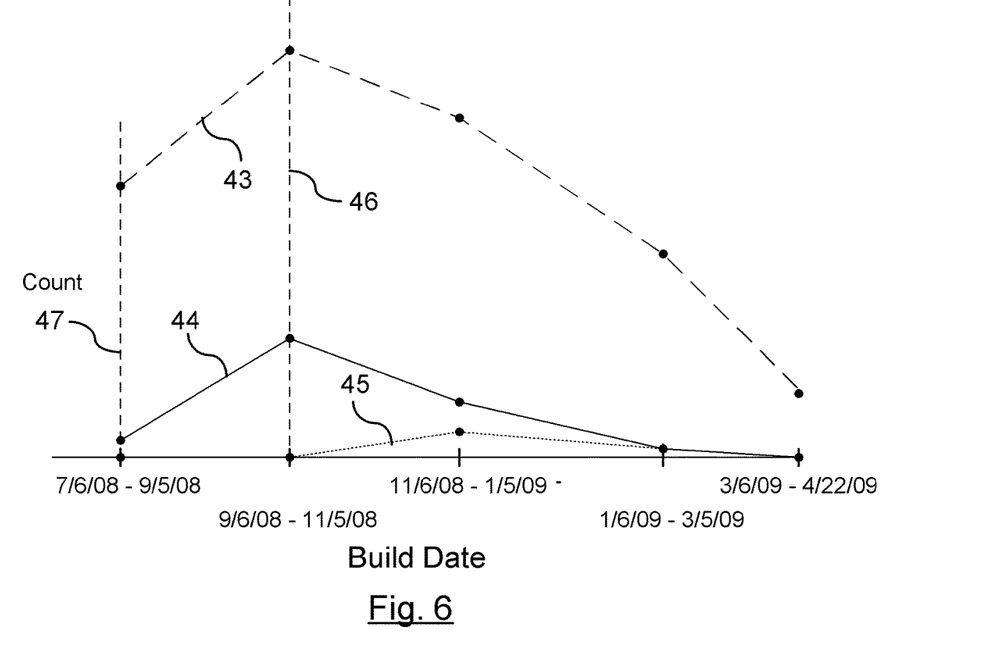
FIG. 6 is a line plot of DTCs having the highest anomalies.
Figure 7A:
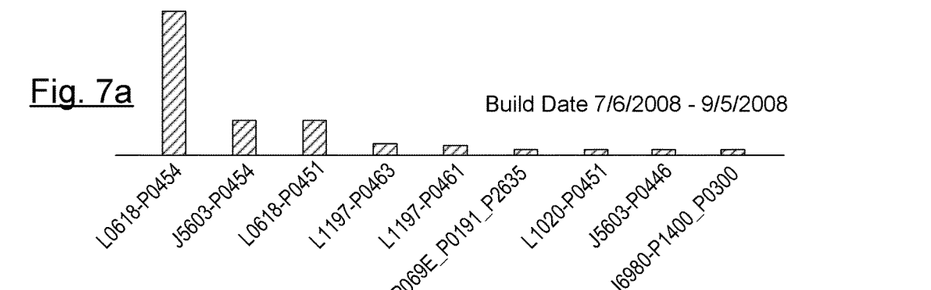
FIGS. 7a-7e is a bar comparison chart as a function of repair codes and DTCs for different build dates of equipment.
Figure 7B:
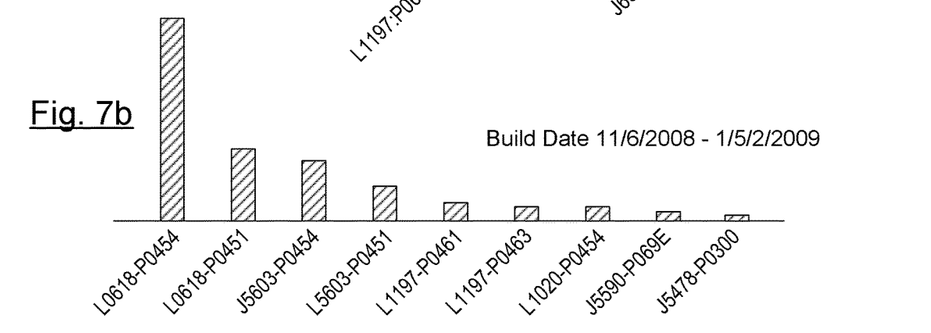
Figure 7C:
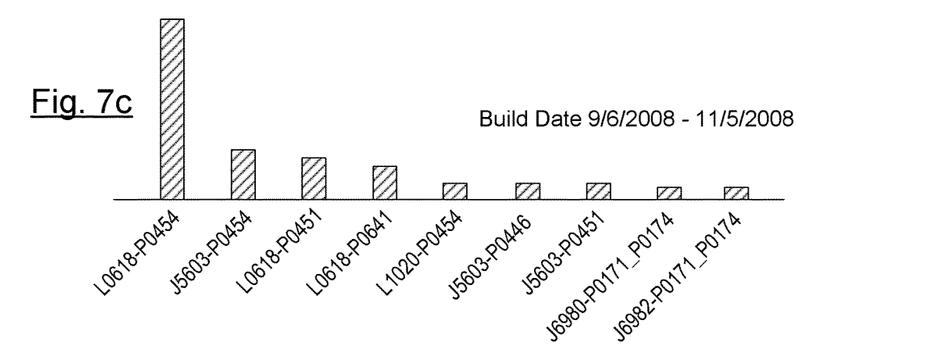
Figure 7D:
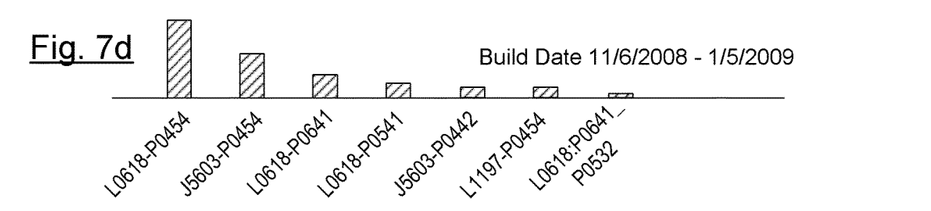
Figure 7E:
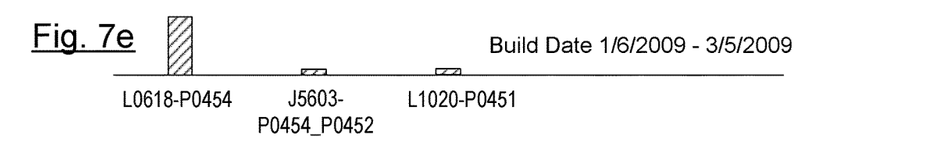

FIG. 6 illustrates a line chart showing the top incorrectly reported DTCs over the entire build date time periods as identified in FIGS. 5a-5e. Each respective line graph represents a respective repair code. For example, line 43 represents DTC P0454, line 44 represents DTC P0451, and line 45 represents DTC P0641. A common practice is to detect the DTC anomaly in the data when a large infusion of incorrectly reported DTCs has been reported as shown at 46. Utilizing the comparator module and plotting the results shows that the fault detection system can identifies trends early in data reporting period such as that shown at time period 47.

FIGS. 7a-7e illustrate bar chart comparisons for detecting anomalies by an associated labor code and DTC. Data from FIGS. 3a-3c and FIGS. 5a-5c are combined and categorized to further illustrate to the subject matter expert the number of DTCs associated with a respective labor code. Inappropriately recorded DTCs are segregated and re-categorized with the respective repairs codes they were reported with to further identify where the anomaly may be present. Based on the graphs, shown in FIGS. 7a-7e for each build date time period, the respective labor codes and the associated DTCs that were identified as anomalies being the most problematic can be readily identified and analyzed by the subject matter expert for determining the rationale as to why these particular repair codes and DTCs are inappropriately utilized with one another. Moreover, the subject matter experts can immediately investigate why the misdiagnoses are taken place (e.g., incorrect repair procedures in the service manual, hard to follow procedures, etc.).

Figure 8:
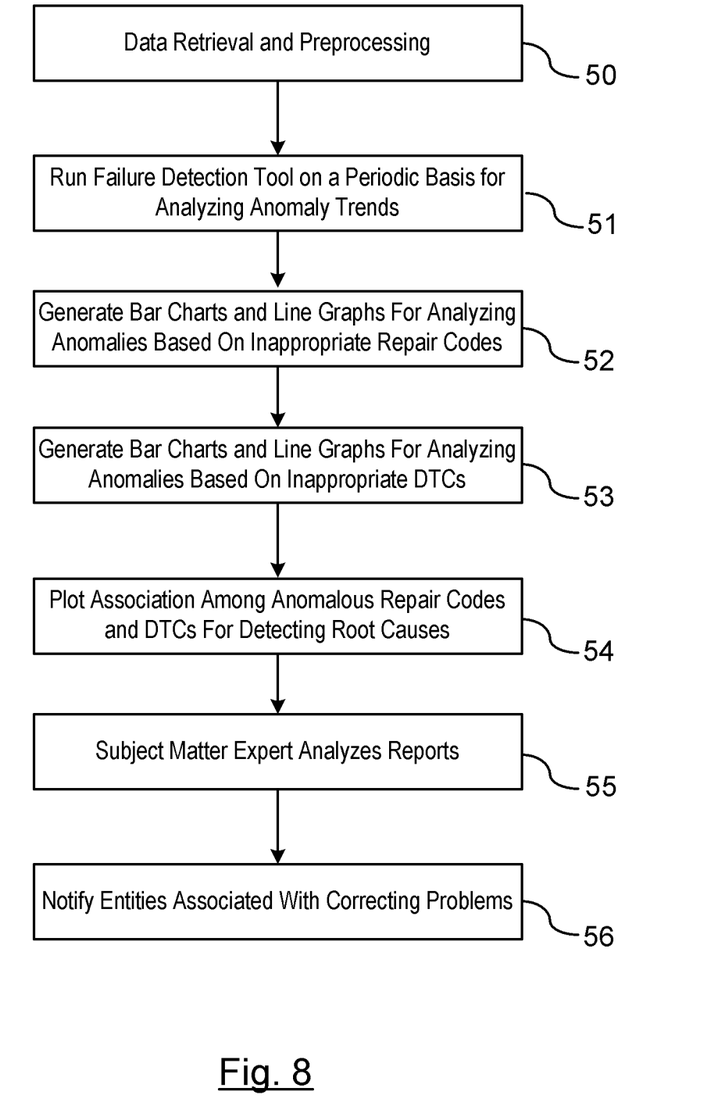
FIG. 8 illustrates a flow chart of the field failure anomaly detection process.

FIG. 8 illustrates a flowchart of a broad overview of the field failure anomaly detection process.

In step 50, data is collected, preprocessed, and stored until the field failure detection tool is executed. Preprocessing involves the compilation and indexing of data so that the field failure detection tool can retrieve the data from memory when the routine is executed.

In step 51, the field failure detection analysis tool is run for analyzing the data and determining anomaly trends in the reported field failure data.

In step 52, bar charts and line graphs pertaining to equipment built over respective time periods are generated as a function of repair codes.

In step 53, bar charts and line graphs pertaining to equipment built over respective time periods are generated as a function of DTCs.

In step 54, bar charts pertaining to equipment built over respective time periods are generated as a function of both DTCs and repair codes. The anomaly for each respective labor code is categorized based on the associated DTC which was recorded with the repair code when the repair was made.

In step 55, the reports are provided to a subject matter expert where trends are identified by the subject matter expert and root causes determined. The various groupings of data in each report provide clues to the subject matter expert for determining the root cause of the anomaly. The root cause may pertain to the servicing/diagnostic procedures provided to the service providers or an incorrect identification of the component to be repaired.

In step 56, entities that directly affect or assist in correcting the identified repair misdiagnoses are notified. Such entities may include, but are not limited to, service technicians, engineers, software engineers responsible for coding the diagnostic tools and preparing updates, and personnel for drafting and correcting the service manuals.

Figure 9:
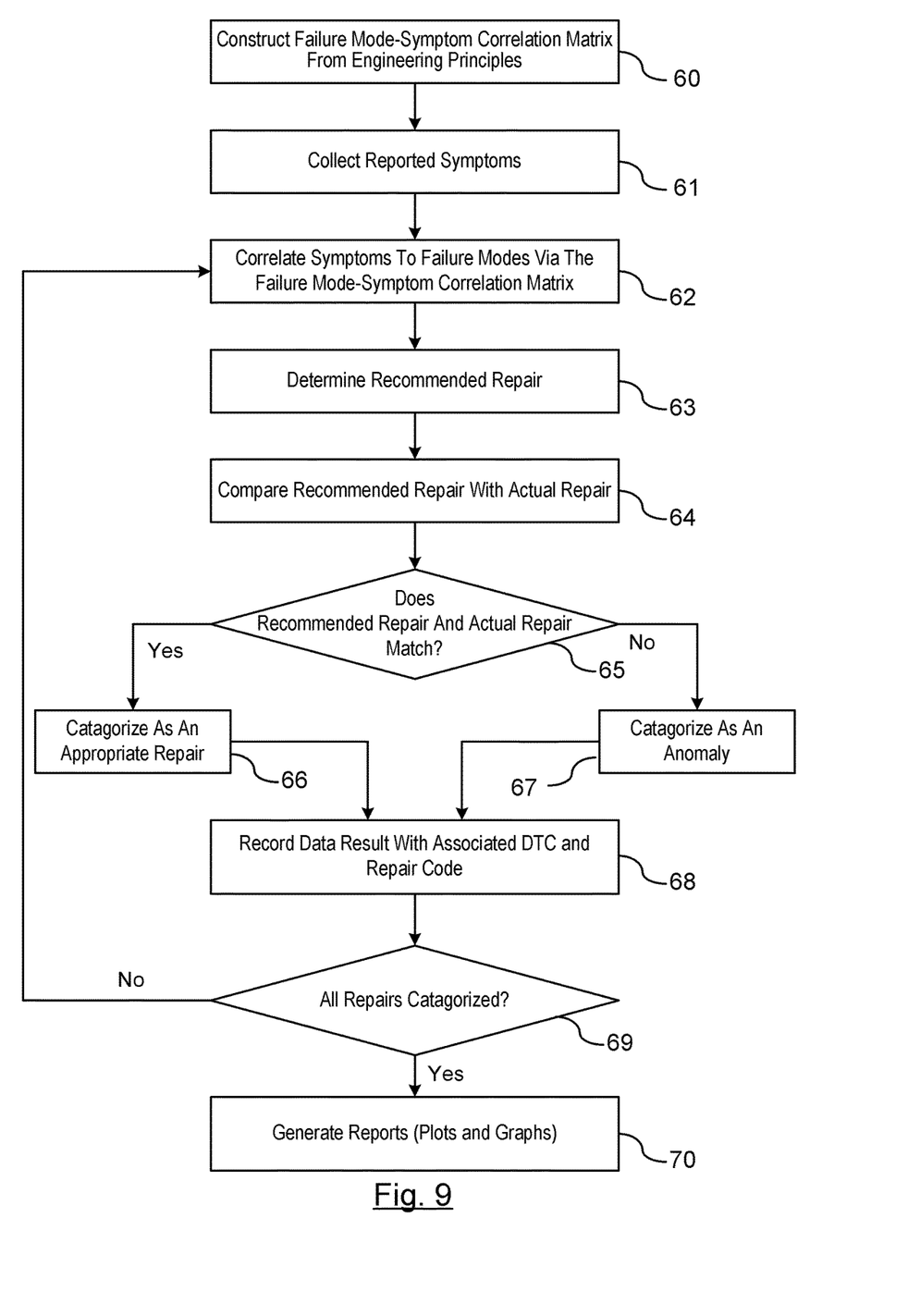
FIG. 9 illustrates a flow chart of a method for categorizing repairs.

FIG. 9 illustrates a flowchart of a detailed process for identifying field failure anomalies. In step 60, a failure-symptom correlation matrix is constructed from known engineering principles.

In step 61, repair codes, and symptoms including, but not limited to, DTCs, operating parameter identifiers (PIDs), scan tool values, technician test outcomes, customer complaints, and text symptoms associated with the equipment are provided to a memory for storing the data.

In step 62, the reported symptom data is provided to the field failure detection system. The diagnostic reasoner correlates the symptoms to the failure modes utilizing the failure mode-symptom correlation matrix.

In step 63, the recommended repairs are identified using a diagnostic reasoner in response to the failure modes identified in step 62.

In step 64, the actual repair is compared with each of the recommended repairs.

In step 65, a determination is made whether the actual repair matches any of the recommended repairs. If the determination is made that the actual repair matches any of the recommended repairs, then the routine proceeds to step 66, otherwise the routine proceeds to step 67.

In step 66, the repair is categorized as an appropriate repair.

In step 67, the repair is categorized as an anomaly.

In step 68, the repairs from steps 66 and 67 are recorded in memory as represented by repair code and associated DTC for further processing.

In step 69, a determination is made whether all repairs have been analyzed by the field failure detection system. If all repairs have not been analyzed, then a return is made to step 62 to execute the routine for the next repair. If all repairs have been analyzed by the field failure detection system, then the routine proceeds to step 70.

In step 70, a field failure anomaly reports are generated based the data stored in memory. The anomaly reports may be generated as a function of the repair codes, or the DTCs, or a combined repair codes and DTCs.

It should be understood that although the embodiment described herein relates to vehicle and vehicle servicing centers, the invention described herein can apply to other types of equipment outside of the automotive field.

While certain embodiments of the present invention have been described in detail, those familiar with the art to which this invention relates will recognize various alternative designs and embodiments for practicing the invention as defined by the following claims.

What is claimed is:

1. A method of detecting anomalies in service repairs for equipment, the method comprising:
    generating a failure mode-symptom correlation matrix module that correlates failure modes to symptoms, each of the failure modes being identifiable with a respective occurrence in how equipment failure can occur, wherein the correlation of the symptoms to the failure modes are generated in response to a plurality of engineering principles, the failure mode-symptom correlation matrix module being customizable for different equipment, the failure mode-symptom correlation matrix being adaptively modifiable for updating and refinement based on respective repair operations relating to each symptom;
    collecting diagnostic trouble codes for an actual repair for the equipment, the diagnostic trouble codes generated by a processor of the equipment in response to a potential malfunction of a component in the equipment;
    inputting the diagnostic trouble codes to a diagnostic reasoner processor;
    applying diagnostic assessment by the diagnostic reasoner processor for determining a recommended repair to perform on the equipment in response to the diagnostic trouble codes and the correlations of the failure modes and symptoms in the failure mode-symptom correlation matrix module;
    comparing the recommended repair with the actual repair used to repair the equipment;
    identifying a mismatch in response to the recommended repair not matching the actual repair;
    generating reports displaying all of the identified mismatches;
    analyzing the reports for determining repair codes having an increase in a number of anomalies; and
    providing service centers the recommended repair for the failure mode of the equipment;
    receiving a notice of performance of the recommended repair; and
    updating the failure mode-symptom correlation matrix using the notice.

2. The method of claim 1, wherein the diagnostic reasoner processor utilizes the reported diagnostic trouble codes as a symptom, wherein the diagnostic reasoner processor utilizes the failure mode-symptom correlation matrix module to correlate the symptom to at least one failure mode, and wherein the recommended repair is identified in response to the at least one failure mode.

3. The method of claim 2, wherein at least one other symptom identified by the service center is provided to the diagnostic reasoner processor, wherein the diagnostic reasoner processor utilizes the diagnostic trouble codes and the at least one other symptom for identifying the at least one failure mode.

4. The method of claim 1, wherein the engineering principles include a failure mode effects and analysis tool.

5. The method of claim 1, wherein the engineering principles include a failure mode effects and criticality analysis tool.

6. The method of claim 1, wherein the engineering principles include service manuals diagnostics.

7. The method of claim 1, wherein the engineering principles include reliability reports.

8. The method of claim 1, wherein the engineering principles include field failure data.

9. The method of claim 1, wherein the recommended repair is used to identify a root cause of the equipment failure.

10. The method of claim 1, wherein the mismatches are tracked over a duration of time as a function of an equipment build date.

11. The method of claim 1, wherein the failure modes are identified as a function of repair codes by an equipment service provider.

12. The method of claim 1, wherein the repair codes are collected from a plurality of equipment service providers for collectively identifying trends in repairs.

13. The method of claim 1, wherein the reports are generated as a function of an aggregate number of anomalies for each of the repair codes.

14. The method of claim 13, wherein the reports are generated as a function of an aggregate number of anomalies for each diagnostic trouble code.

15. The method of claim 14, wherein the reports are generated as a function of an aggregate number of anomalies for a combined repair code and diagnostic trouble code, each respective repair code being segregated by an associated diagnostic trouble code recorded for the repair.

16. A field failure detection system comprising:
a failure mode-symptom correlation matrix module that correlates failure modes to symptoms, each of the failure modes being identifiable with a respective occurrence in how equipment failure can occur, and the correlation of the symptoms to the failure modes being generated in response to a plurality of engineering principles, the failure mode-symptom correlation matrix module being customizable for different equipment, the failure mode-symptom correlation matrix being adaptively modifiable for updating and refinement based on respective repair operations relating to each symptom;
a memory for storing diagnostic trouble codes of repaired equipment, the diagnostic trouble codes generated by a processor of the equipment in response to a potential malfunction of a component in the equipment, the memory further storing repair codes representing a repair made to the repaired equipment by a service provider; and
a processing unit for correlating the diagnostic trouble codes with the failure mode-symptom correlation matrix module for determining a recommended repair to perform on the equipment in response to the diagnostic trouble codes and the correlations of the failure modes and symptoms in the failure mode-symptom correlation matrix module,
wherein the recommended repair is compared with the actual repair used to repair the equipment, wherein a mismatch is identified in response to the recommended repair not matching the actual repair, and wherein reports are generated identifying the identified mismatches for determining which repair codes have an increase in a number of anomalies, wherein service centers are provided with the recommended repair for the identified failure mode of the equipment, wherein a notice of performance of the recommended repair is received, and wherein the failure mode-symptom correlation matrix is updated using the notice.

17. The system of claim 16, wherein the reports generated further include diagnostic trouble code reports, the diagnostic trouble code reports being generated as a function of the diagnostic trouble codes, wherein anomalies in the diagnostic trouble codes are identified in response to the diagnostic code reported by the service provider having no expected relationship to the repair code that identifies the repair made to the equipment.

18. The system of claim 16, wherein the reports generated further include combined diagnostic trouble code and repair code reports, the diagnostic trouble code and repair code reports being generated as a function of the repair codes grouped by an associated diagnostic trouble code.

19. The system of claim 16, wherein the processor unit is a diagnostic reasoner processor, the diagnostic reasoner processor utilizes the reported diagnostic trouble codes as a symptom, wherein the diagnostic reasoner processor utilizes the failure mode-symptom correlation matrix module to correlate the symptom to at least one failure mode, and wherein the recommended repair is identified in response to the at least one failure mode.

20. The system of claim 19, wherein at least one other symptom identified by the service center is provided to the diagnostic reasoner processor, wherein the diagnostic reasoner processor utilizes the diagnostic trouble codes and the at least one other symptom for identifying the at least one failure mode.

21. The system of claim 16, wherein the failure mode-symptom correlation matrix module is generated based on engineering principles, the engineering principles including failure analysis processes, service manuals, and reliability reports.

22. A method comprising:
obtaining equipment having at least one prior repair for an identified failure mode;
receiving a notification for the equipment, the notification indicating a recommended repair, the notification generated by:
correlating, using a plurality of engineering principles, a plurality of failure modes to a plurality of symptoms thereby producing correlated data, each of the plurality of failure modes being identifiable with a respective occurrence in how equipment failure can occur,
generating a failure mode-symptom correlation matrix module using the correlated data, the failure mode-symptom correlation matrix module being customizable for a plurality of manufactured equipment, the plurality of manufactured equipment including the equipment, the failure mode-symptom correlation matrix being adaptively modifiable for updating and refinement based on respective repair operations relating to each symptom, collecting diagnostic trouble codes for an actual repair of the equipment, the diagnostic trouble codes generated by a processor of the equipment, inputting the diagnostic trouble codes to a diagnostic reasoner processor, applying a diagnostic assessment by the diagnostic reasoner processor for determining a recommended repair to perform on the equipment using the diagnostic trouble codes and correlations of the plurality of failure modes and the plurality of symptoms in the failure mode-symptom correlation matrix module, comparing the recommended repair with the actual repair of the equipment, identifying at least one mismatch in response to the recommended repair not matching the actual repair, generating reports displaying the at least one mismatch, and analyzing the reports to determine repair codes having an increase in a number of anomalies;

performing the recommended repair on the equipment thereby eliminating the failure mode of the vehicle; and reporting performance of the recommended repair to the failure mode-symptom correlation matrix module.

* * * * *